(12) United States Patent
Andris et al.

(10) Patent No.: US 11,431,258 B2
(45) Date of Patent: Aug. 30, 2022

(54) SCALABLE POWER INVERTER

(71) Applicant: Caterpillar Inc., Peoria, IL (US)

(72) Inventors: Eric M. Andris, Dunlap, IL (US); Johnson David Sugidharan, Tamilnadu (IN)

(73) Assignee: Caterpillar Inc., Peoria, IL (US)

(*) Notice: Subject to any disclaimer, the term of this patent is extended or adjusted under 35 U.S.C. 154(b) by 69 days.

(21) Appl. No.: 17/130,253

(22) Filed: Dec. 22, 2020

(65) Prior Publication Data
US 2022/0200467 A1  Jun. 23, 2022

(51) Int. Cl.
*H02M 7/538* (2007.01)
*H02M 7/00* (2006.01)
*H02M 7/5387* (2007.01)

(52) U.S. Cl.
CPC ....... *H02M 7/003* (2013.01); *H02M 7/53871* (2013.01)

(58) Field of Classification Search
CPC ...... H02M 7/003; H02M 7/537; H02M 7/538; H02M 7/53802; H02M 7/53846; H02M 7/538466; H02M 7/53862; H02M 7/5387; H02M 7/53871; H05K 5/0204; H05K 5/0217; H05K 5/0256
See application file for complete search history.

(56) References Cited

U.S. PATENT DOCUMENTS

| | | | |
|---|---|---|---|
| 6,462,976 B1 | 10/2002 | Olejniczak et al. | |
| 6,972,972 B2 | 12/2005 | Duncan et al. | |
| 7,113,405 B2 | 9/2006 | Armstrong et al. | |
| 9,295,184 B2 | 3/2016 | Korich et al. | |
| 9,722,510 B2 | 8/2017 | Kunin et al. | |
| 10,277,035 B2 | 4/2019 | Gudgel et al. | |
| 10,447,170 B1 | 10/2019 | Wu et al. | |
| 2004/0227476 A1 | 11/2004 | Guerra et al. | |
| 2015/0349661 A1 | 12/2015 | Kunin | |
| 2016/0172997 A1 | 6/2016 | Andris et al. | |
| 2017/0063065 A1* | 3/2017 | Doo | H02M 7/003 |
| 2018/0076663 A1 | 3/2018 | Gudgel | |
| 2018/0110150 A1 | 4/2018 | Blanchet et al. | |
| 2018/0166995 A1 | 6/2018 | Friedlund | |

(Continued)

FOREIGN PATENT DOCUMENTS

WO    WO2017020406    2/2017

*Primary Examiner* — Adolf D Berhane
(74) *Attorney, Agent, or Firm* — Lee & Hayes, PLLC

(57) ABSTRACT

A power inverter has an inverter unit with a housing defining a main compartment and a first lateral compartment adjacent the main compartment. The main compartment contains an inverter power module configured to convert direct current (DC) power into alternating current (AC) power output, an inverter driver module configured to provide driving signals to drive the inverter power module, an inverter control module configured to provide control signals to the inverter driver module to control the AC power output, and a capacitor for coupling to the DC power. The capacitor is arranged on or over at least one of the inverter power module, the inverter driver module, or the inverter control module. Additionally, the power inverter has a base on which the housing sits, the base comprising a heat sink configured to draw heat away from one or more of the inverter power module, the inverter driver module, or the inverter control module.

20 Claims, 10 Drawing Sheets

(56) References Cited

U.S. PATENT DOCUMENTS

| | | |
|---|---|---|
| 2019/0050949 A1 | 2/2019 | Orsini |
| 2019/0182993 A1 | 6/2019 | Tokuyama |
| 2019/0296658 A1* | 9/2019 | Chung .................. H02M 7/003 |
| 2020/0274375 A1 | 8/2020 | Griffiths et al. |
| 2021/0344258 A1* | 11/2021 | Singh ...................... B60R 16/03 |

* cited by examiner

# SCALABLE POWER INVERTER

TECHNICAL FIELD

The present disclosure is directed to power inverters and, in particular, to scalable power inverters.

BACKGROUND

Inverters utilize power electronics to supply varying AC electrical output to multiple applications and loads. In a variable-speed genset system, an internal combustion engine or other variable-speed source of mechanical power mechanically drives a generator to provide a variable AC electrical output. These genset systems typically use power electronics to harness and apply that AC output.

An inverter has a certain maximum power output, such as 150 kW. Different applications, however, require varying amounts of power. For example, off-highway machine applications typically require power in the range of 150 kW to 1,200 kW. Finding an inverter sufficient to meet a given power demand, collecting a combination of inverters that together meet the power demand, or building a custom inverter to handle a specific application can be difficult and/or costly.

Solutions for scaling inverter power have been developed. For example, U.S. Pat. No. 9,722,510 ("the '510 patent") describes an inverter platform with a "modular" printed circuit board. The components that mount to the printed circuit board can be switched among different physical configurations to provide a desired amount and type of power output. For example, the circuit board has a capacitor bank footprint in which different combinations of capacitors can be populated and connected to the rectifier or the inverter bridge.

Although the solution of the '510 patent provides some degree of inverter configurability and scalability, it may have certain drawbacks. For example, ultimately, the scalability and configurability are limited by the footprint of the printed circuit board and the particular components that may be populated into that footprint.

The present disclosure is directed to one or more improvements in the existing technology.

SUMMARY

One aspect is directed to a power inverter. The power inverter may have an inverter unit with a housing defining a main compartment and a first lateral compartment adjacent the main compartment. The main compartment may contain an inverter power module configured to convert direct current (DC) power into alternating current (AC) power output, an inverter driver module configured to provide driving signals to drive the inverter power module, an inverter control module configured to provide control signals to the inverter driver module to control the AC power output, and a capacitor for coupling to the DC power. The capacitor may be arranged on or over at least one of the inverter power module, the inverter driver module, or the inverter control module. Additionally, the power inverter may have a base on which the housing sits, the base comprising a heat sink configured to draw heat away from one or more of the inverter power module, the inverter driver module, or the inverter control module.

Another aspect relates to a machine that has a power source, a generator mechanically coupled to the power source and configured to generate alternating current (AC) power, a rectifier coupled to receive alternating current (AC) power from of the generator and provide a rectified output, and a direct current (DC) link configured to receive the rectified output and provide a DC power output. The machine may also have an inverter unit having a housing defining a main compartment and a first lateral compartment adjacent to the main compartment. The main compartment may contain an inverter power module configured to convert the DC power output into an AC power output and vice versa, an inverter driver module configured to provide driving signals to drive the inverter power module, and an inverter control module configured to provide control signals to the inverter driver module to control the AC power output. Additionally, the main compartment may have a capacitor for coupling to the DC power, the capacitor being arranged on or over at least one of the inverter power module, the inverter driver module, or the inverter control module. The inverter unit may have a base on which the housing sits, the base comprising a heat sink configured to draw heat away from one or more of the inverter power module, the inverter driver module, or the inverter control module.

Another aspect relates to a power inverter. The power inverter may include a first inverter unit that has a first housing portion defining first a main compartment and a first lateral compartment adjacent the first main compartment. The first main compartment may contain a first inverter power module configured to convert direct current (DC) power into alternating current (AC) power output, a first inverter driver module configured to provide driving signals to drive the inverter power module, a first inverter control module configured to provide control signals to the inverter driver module to control the AC power output, and a first capacitor for coupling to the DC power, the capacitor being arranged on or over at least one of the inverter power module, the inverter driver module, or the inverter control module.

The power inverter may also include a second inverter unit having a second housing portion defining a second main compartment and a second lateral compartment adjacent the second main compartment. The second main compartment main contain a second inverter power module configured to convert the DC power into the AC power and vice versa, a second inverter driver module configured to provide driving signals to drive the second inverter power module, a second inverter control module configured to provide control signals to the second inverter driver module, and a second capacitor for coupling to the DC power, the second capacitor being arranged on or over at least one of the second inverter power module, the second inverter driver module, or the second inverter control module. Additionally, the power inverter may have a base on which the first and second housing portions sit, the base comprising a heat sink configured to draw heat away from one or more of the first and second power modules, the first and second inverter driver modules, or the first and second inverter control modules.

BRIEF DESCRIPTION OF THE DRAWINGS

FIG. 4 illustrates two inverter units of FIG. 3 combined in a.

DETAILED DESCRIPTION

Reference will now be made in detail to specific embodiments or features, examples of which are illustrated in the accompanying drawings. Wherever possible, corresponding or similar reference numbers will be used throughout the drawings to refer to the same or corresponding parts.

Figure 1:
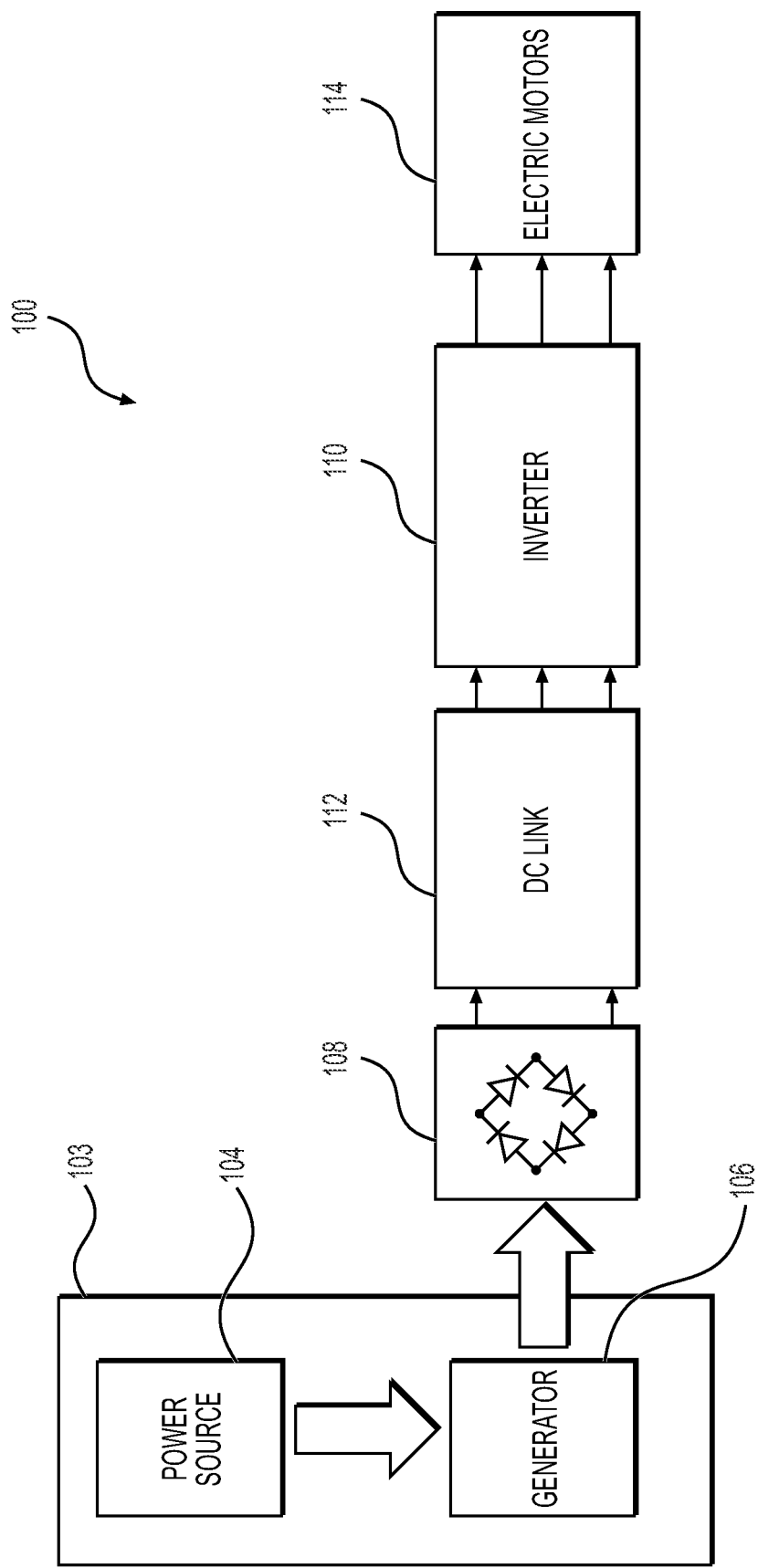
FIG. 1 is a block diagram illustrating an exemplary electric drive system of a machine.

FIG. 1 is a block diagram illustrating an exemplary electric drive system 100 of a machine (not shown). The machine, for example, may be an on-highway or off-highway vehicle used for industrial operations such as mining, construction, farming, transportation, forestry, material handling, or any other industrial operations. The machine may include a frame (not shown) for supporting the electric drive system 100. The electric drive system 100 may be further configured to drive ground-engaging devices (not shown) of the machine, such as wheels, tracks, treads, or other devices for propelling the machine. The machine may further include an operator station (not shown) that encloses various operator input devices and interfaces for controlling one or more operations of the machine.

As shown, the electric drive system 100 may include a genset 103 having a power source 104, such as an internal combustion engine. Within the genset 103, the power source 104 may be mechanically coupled to a generator 106, to drive the generator 106. The generator 106 may be configured to convert the mechanical power input received from the power source 104 into a variable-frequency alternating current (AC) output.

As illustrated in FIG. 1, the generator 106 provides the AC output to the rectifier 108, e.g., via an electrical coupling. The rectifier 108 may convert the AC output into a direct current (DC) power output. The rectifier 108 may be further coupled to an inverter 110 via a DC link 112 to supply the DC power output to the inverter 110. The inverter 110 may be configured to convert the DC power output received from the rectifier 108 into an AC power output. The inverter 110 may be further electrically coupled to one or more electric motors 114 and further configured to supply variable frequency AC power output to the electric motors 114 based on operational demands of the machine.

The electric motors 114 may be coupled to the ground-engaging devices to drive the ground-engaging devices using the AC output from the inverter 110. It is also contemplated that the electric motors 114 may supply power through the DC link 112 during a power-regeneration event, such as when gravity or momentum acting on the ground-engaging devices supply power to drive the electric motors 114. In an embodiment, an energy-storing device (not shown), such as a battery, may also be provided to store at least part of the electrical energy generated from the generator 106 or from power regeneration.

In some embodiments, the machine may have an auxiliary power converter unit (not shown) configured to supply electric power to one or more external electric devices (not shown). The auxiliary power converter unit may be electrically connected to the DC link 112 to receive the DC output from the rectifier 108. The auxiliary power converter unit may include an auxiliary inverter (not shown) configured to be electrically connected to the DC link 112. The auxiliary inverter may also be configured to convert the DC output received from the rectifier 108 into an AC output. That AC output may be further communicated to a filter unit (not shown) configured to enhance a quality of the AC output by reducing undesirable harmonic content in the AC output to meet power quality requirements for external electric devices, such as power tools, welding equipment, and the like.

Figure 2:
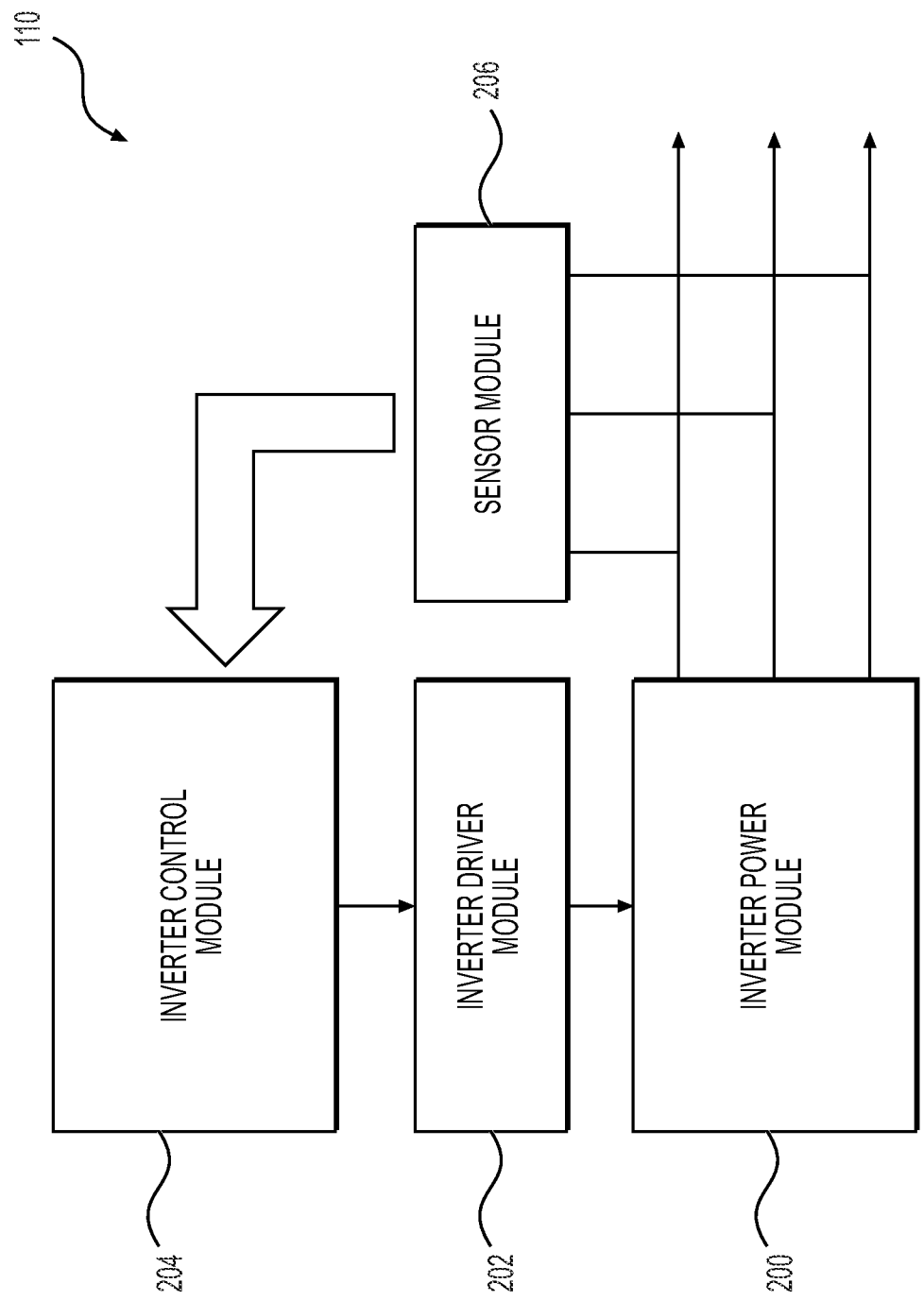
FIG. 2 shows a block diagram representation of the inverter associated with the electric drive system of FIG. 1.

FIG. 2 shows a block diagram representation of the inverter 110. The inverter 110 may include an inverter power module 200, an inverter driver module 202, an inverter control module 204, and a sensor module 206.

The inverter power module 200 may be configured to convert DC power into AC power or vice versa, depending on the configuration. The inverter power module 200 may be coupled to the DC link 112 and to the one or more electric motors 114 (or other load), potentially thorough a filter or other components. The inverter power module 200 may receive the DC power from the DC link 112, convert it to AC power based on drive signals from the inverter driver module 202, and provide the AC power output to the one or more electric motors 114 (or other load). Additionally, the inverter power module 200 may receive AC power from the one or more electric motors 114 (or other sources), such as during a power-regeneration event in which the electric motors 114 act as generators, convert the AC power to DC power, and couple the DC power to the DC link 112.

The inverter power module 200 may include semiconductor bridge circuitry (not shown). For example, the circuitry may include a combination of silicon insulated-gate bipolar transistors (IGBT) or field-effect transistors (FET), depending on the implementation. Alternatively, the circuitry may include a combination of wide band-gap transistors, such as Silicon Carbide or Gallium Nitride transistors. Also, in examples, the transistors may be configured as a multi-level inverter bridge providing intermediate voltage levels at each leg of the bridge to allow voltage control of the output or higher-voltage utilization on input/output.

The inverter driver module 202 may generate drive signals to drive the inverter power module 200. In particular, the inverter driver module 202 may receive control signals from the inverter control module 204 and, based on those signals, generate signals to drive gate terminals of the inverter power module 200. In one embodiment, the inverter driver module 202 may include a printed circuit board module with driver circuitry.

The inverter control module 204 may receive, from the sensor module 206, signals containing information about the sensed voltage and/or current of the AC power output (or input) of the inverter power module 200. And, based on those signals, the inverter control module 204 may generate signals to control the inverter driver module 202 to generate or modify desired AC power output (or input) for a given inverter configuration. For example, the inverter power module 200 may be configured for a single-phase output, a two-phase output, a three-phase output, a split-phase output, or another type of output. The inverter control module 204 also may generate control signals in accordance with the particular type of power output for which the inverter power module 200 is configured. In one embodiment, the inverter control module 204 may embody a printed circuit board with computing hardware and/or software configured to analyze the received signals from the sensor module 206 and generate the control signals as output.

In some embodiments, the inverter control module 204 may offer a plurality of selectable power output modes each corresponding to a different type of power output that the inverter power module 200 is configured to generate. The inverter control module 204 may select a desired output mode automatically, or the mode may be selected by an operator through an interface or a field diagnostic/configuration tool.

The sensor module 206 may have sensors configured to sense the current and/or voltage of the AC output (or input). For example, the sensor module 206 may have sensors for each phase of the AC power output (or input) generated (or received by the inverter power module 200). Additionally, the sensor module 206 may provide information regarding the sensed current and/or voltage of the AC power output (or input) to the inverter control module 204. Like the other modules of the inverter, the sensor module 204 may comprise, for example, a printed circuit board having appropriate hardware, software, and/or sensors for sensing electrical characteristics of the AC output or input, analyzing the sensed electrical characteristics, and providing information about the sensed electrical characteristics to the inverter control module 204.

Figure 3:
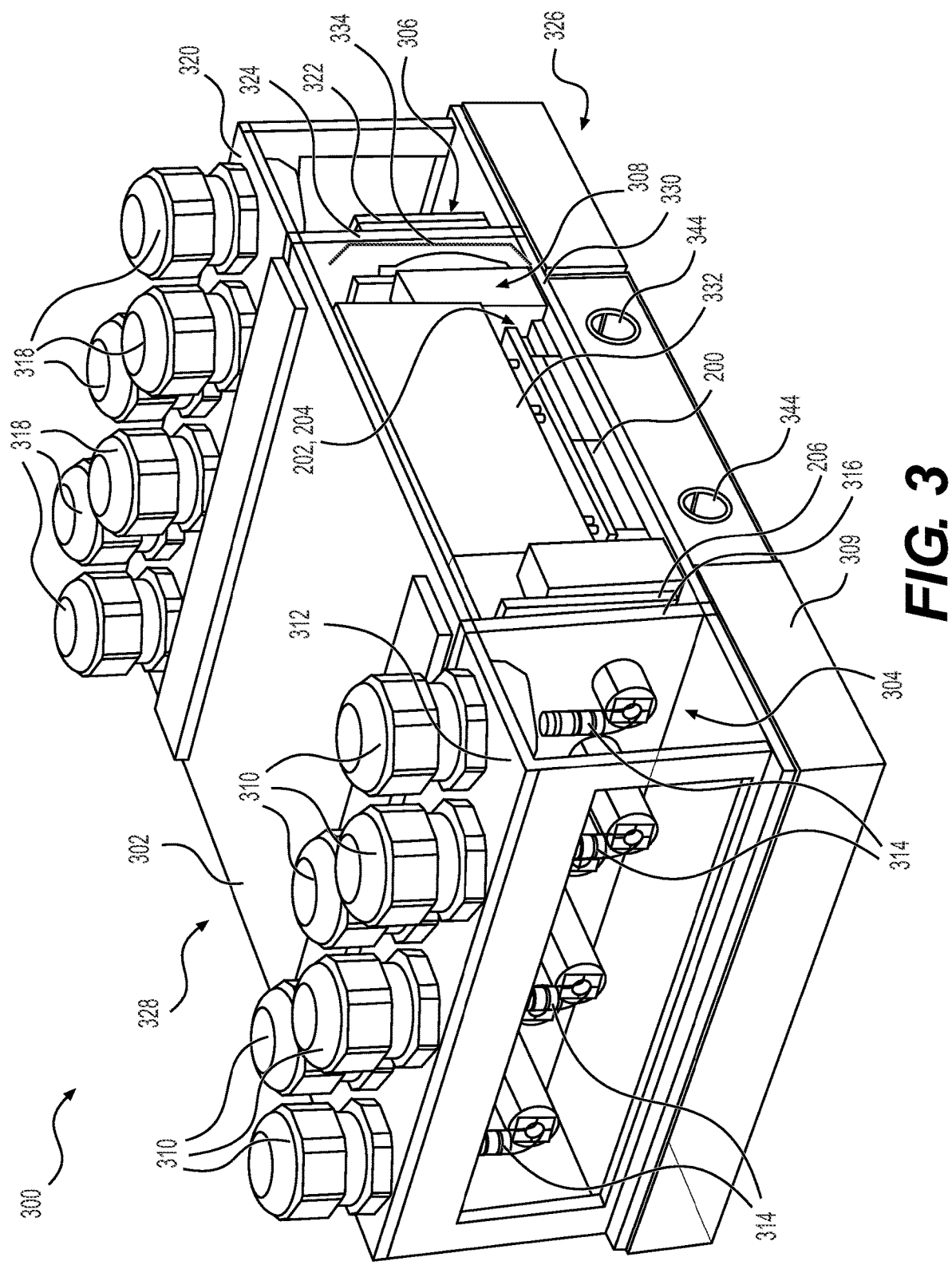
FIG. 3 illustrates an embodiment of an inverter unit of the inverter of FIG. 2, consistent with the disclosed embodiments.

FIG. 3 shows a representation of one embodiment of a single inverter unit 300 of the inverter 110. As explained below, consistent with the disclosed embodiments, the inverter 110 may comprise one or more inverter units 300 to allow for scaling across a range of power levels by combining one or multiple inverter units 300 into a single package.

As shown in FIG. 3, the inverter unit 300 may comprise a housing 302 having a first lateral compartment 304, a second lateral compartment 306, and a main compartment 308. The housing 302 may sit on and mount to a base 309, which may be a heat sink. In the embodiment shown in FIG. 3, the main compartment 308 may have a central location between the first and second lateral compartments 304, 306. The first and second lateral compartments 304, 306 may be opposite one another with respect to the main compartment 308.

In some examples, the housing 302 may be made of extruded aluminum, or an aluminum alloy, and provide strain relief to the inverter unit 300. Although FIG. 3 shows the housing 302 as an open frame, the housing may have covers (not shown) that, when attached, seal the inverter 110 from the outside environment in accordance with design objectives or as required by regulations. In one embodiment, the housing 302 may have a cuboid (i.e., a box) shape.

The first lateral compartment 304 may house and/or support AC connection components of the inverter unit 300. For example, as shown in FIG. 3, AC cable connectors 310 may be mounted to a top surface 312 of the first lateral compartment 304. The AC cable connectors 310, when secured to the top surface 312, may form a seal between the interior of the first lateral compartment 304 and the outside environment. In operation, the first end of a set of electrical cables (not shown) may be connected to the AC cable connectors 310, and the second end of the set of electrical cables may connect directly or indirectly through other circuitry (e.g., a filter) to an AC load or source, such as the electric motors 114, depending on the application. In FIG. 3, the AC cable connectors 310 are shown with covers on. The covers may be removed to attach the electrical cables.

Within the first lateral compartment 304, respective AC cable lugs 314 may connect to the AC cable connectors 310 at a first end and, toward a second end, pass through a wall 316 separating the first lateral compartment 304 from the main compartment 308. Additionally, an AC bus bar (not shown) within the first lateral compartment 304 may couple respective AC cable lugs 314, and their corresponding AC cable connectors 310, in parallel. The AC cable lugs 314 may serve to receive AC power output from the power module 200 in the main compartment 308 and pass it to the AC cable connectors 310. Alternatively, when AC power is received at the connectors 310, e.g., during power regeneration, the AC cable lugs 314 may transmit AC power input from the AC cable connectors 310 to the power module 200 in the main compartment 308. In addition to providing a seal, the first lateral compartment 304 may provide strain relief that prevents forces exerted on the AC cable connectors 310 from being transmitted to the interior components of the inverter unit 300.

The second lateral compartment 306 may house and/or support the DC connection components of the inverter unit 300. For example, as shown in FIG. 3, DC cable connectors 318 may be mounted to the second lateral compartment 306, e.g., on a top surface 320. The DC cable connectors 318, when secured to the top surface 320, extend through the top surface 320 into the second lateral compartment 306 and may form a seal between the interior of the second lateral compartment 306 and the outside environment. In operation, the first end of a set of electrical cables (not shown) may be connected to the DC cable connectors 318, and the second end of the set of electrical cables may connect to a DC load or source, such to the DC link 112, depending on the application. In FIG. 3, the DC cable connectors 318 are shown with covers on, but the covers may be removed to attach the electrical cables.

Within the second lateral compartment 306, the DC cable connectors 318 may couple to a DC bus bar 322. The DC bus bar 322 may serve to receive the DC power from the DC cable connectors 318 and provide the DC power to the interior circuitry of the inverter in the main compartment 308. As shown in FIG. 3, the DC bus bar 322 may be mounted to a wall 324 separating the second lateral compartment 306 from the main compartment 308. The DC bus bar 322 may extend from a front side 326 of the inverter unit 300 to a rear side 328 of the inverter unit 300, connecting the DC cable connectors 318 in parallel.

When power flows in the opposite direction, the DC bus bar 322 may serve to receive DC power from the interior inverter circuitry and pass it to the DC cable connectors 318 for powering an attached DC load. In addition to providing a seal, the second lateral compartment 306, including its top surface 320, may provide strain relief that prevents forces exerted on the DC cable connectors 318 from being transmitted to the interior components of the inverter unit 300. [Eric/Johnson—anything we can add about strain relief? Please fill in the details here, and I can review/revise if needed.]

In examples, multiple instances of the inverter unit 300 may be packaged side-by-side and in a, within a single housing 302, to increase the total power output available. For example, assume a single inverter unit 300 offers a maximum power output of 150 kW. To double to total available power output to 300 kW, two inverter units 300 may be packaged side-by-side within the same housing 302, as a single inverter 110. This configuration is shown in FIG. 4.

Figure 4:
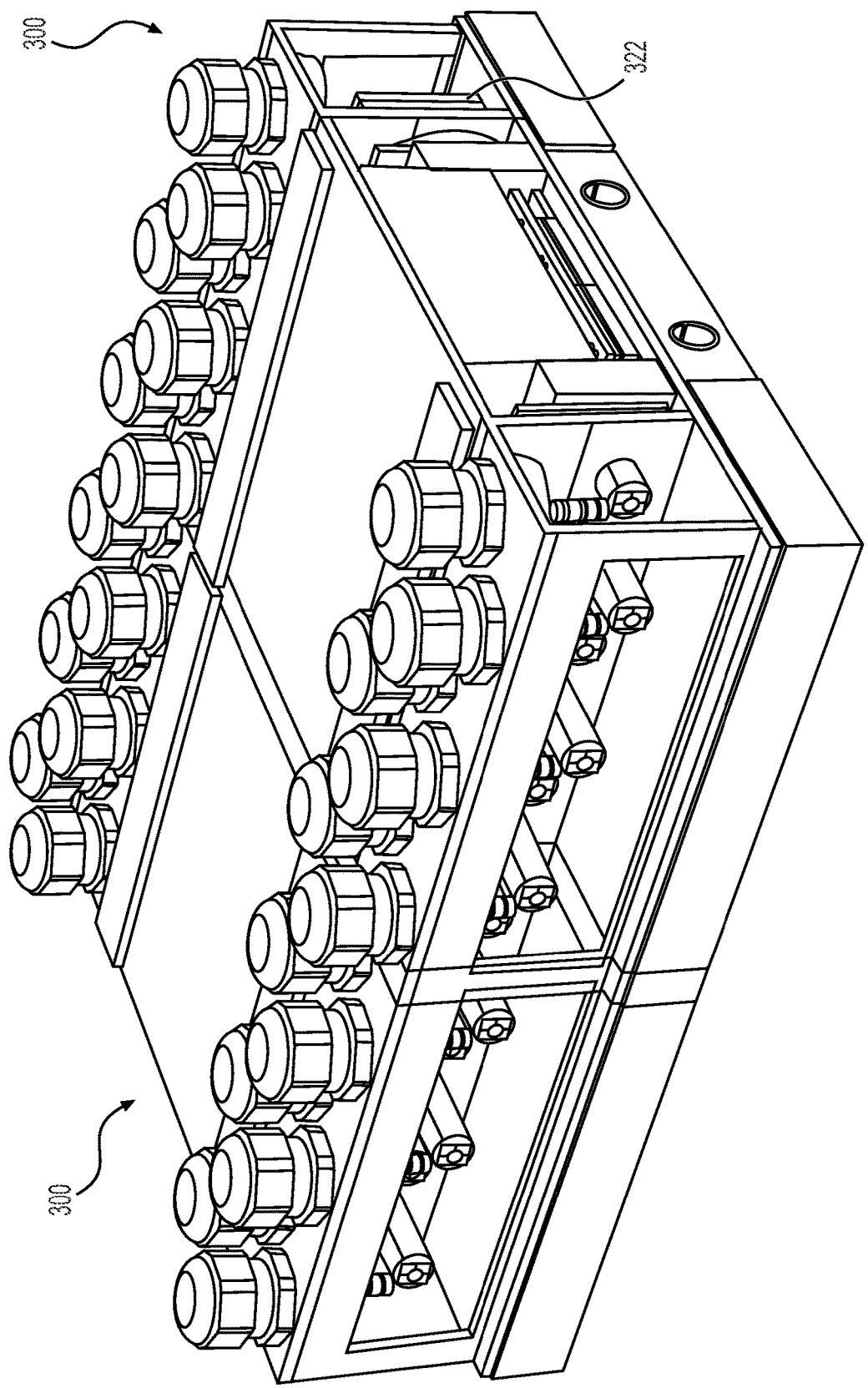

As shown in FIG. 4, in this configuration, the front side 326 of one inverter unit 300 adjoins to the rear side 328 of an adjacent inverter unit 300. The DC bus bars 322 of the adjacent units 300 may be coupled in parallel, e.g., forming a single longer bus bar. That is, the DC bus bar 322 of one inverter unit 300 may continue to extend beyond the front side 326 and/or rear side 328 of that inverter unit 300, and into the second lateral compartment 306 of the adjacent inverter unit 300, where the DC bus bar 322 similarly couples to the DC cable connectors 318 of the adjacent inverter unit 300. The AC bus bar of the adjacent inverter units 300 may similarly be coupled in parallel, thus coupling the AC cable connectors 310 of the adjacent units 300 in parallel.

This configuration may provide several benefits. For example, because they are connected in parallel, a single set of AC cable connectors 310 and/or a single set of DC cable connectors 318 may be used to access the power of both inverter units 300, and the remaining connectors 310 and/or 318 may remain unused, e.g., with their covers on. On the other hand, to handle larger amounts of power and/or current, multiple sets of the connectors 310 and/or 318 may be used. Additionally, the additional sets of connectors 310 and/or 318 may allow multiple sources (e.g., generators) or multiple loads (e.g., motors) to be respectively connected to same electrical nodes without requiring additional hardware to electrically couple the multiple sources or loads to the same set of connectors 310 and/or 318. Additionally, as shown, in this side-by-side configuration, the multiple inverter units 300 may share the same base 309.

In another example, two inverter units 300 may be combined in a stack (i.e., "back-to-back") such that they share the same base 309. In this configuration, shown in FIG. 5, the two inverter units 300 may share a common DC bus bar 322 and a common AC bus bar. For example, the DC bus bar 322 of one unit 300 may extend through openings in a bottom interior surface 330 of the second lateral compartment 306, through openings in the base 309, and through openings in a bottom interior surface 330 of the second lateral compartment 306 of the adjoining inverter unit 300 below. The DC bus bar 322 may continue to extend into the second lateral compartment 306 of the adjoining inverter unit 300, where the DC bus bar 322 similarly couples to the DC cable connectors 318 of the adjacent inverter unit 300 in parallel with those of the first unit 300. The AC bus bar may have a similar configuration to connect the AC cable connectors 310 of the two stacked inverter units 300 in parallel.

Figure 6:
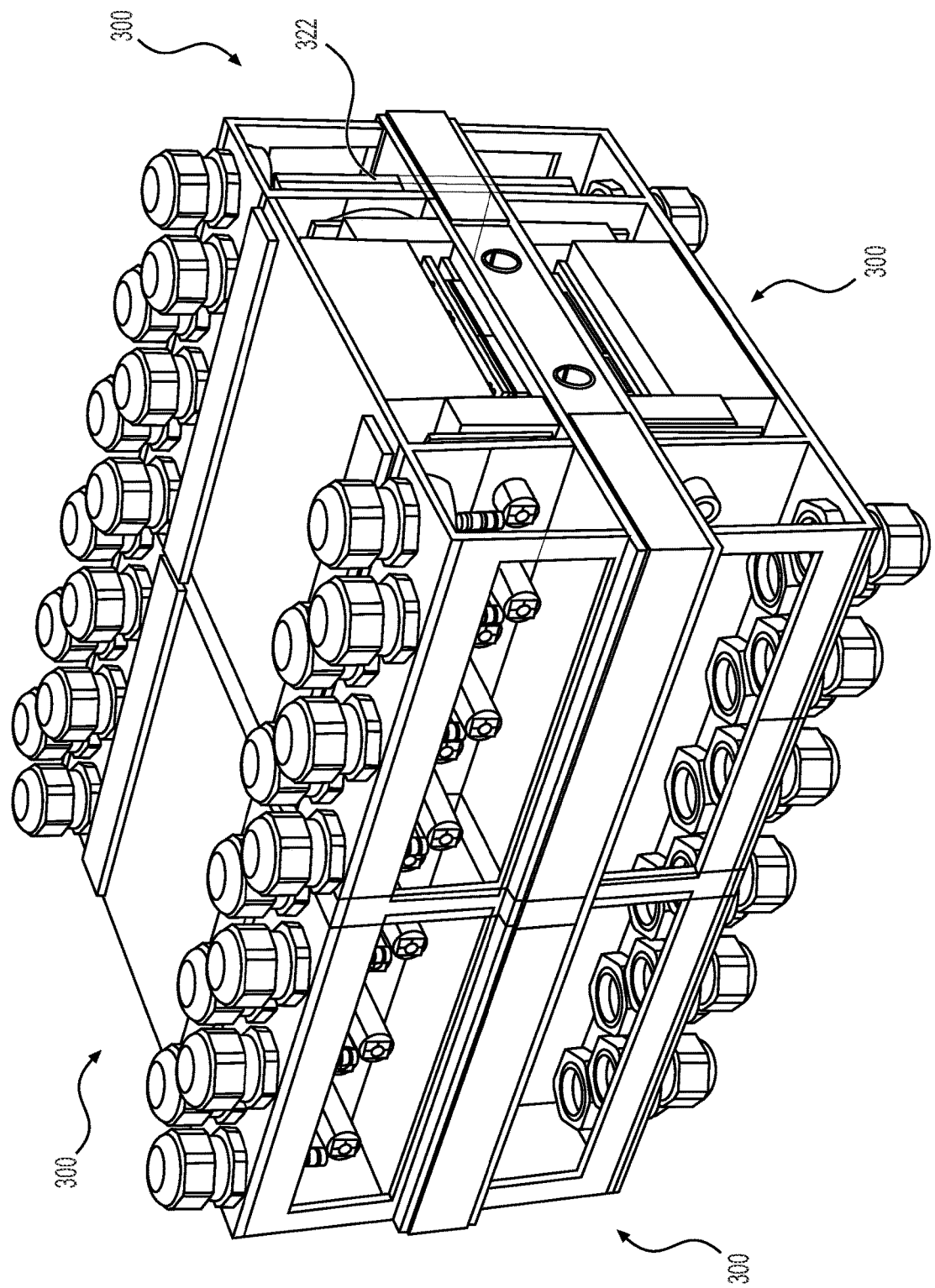
FIG. 6 illustrates four inverter units of FIG. 3 combined both in a and in a stack.

In still other embodiments, multiples of two inverter units 300 may be combined both side-by-side and back-to-back (i.e., both in a sequence and in a stack). For example, configuring a plurality of inverter units 300 side-by-side and back-to-back may both result in effectively paralleling the unit 300 while accommodating different form factors or footprints for different applications. This configuration is shown in FIG. 6, which illustrates four inverter units 300 combined in this manner. Each of these configurations allows the scaling up of power output under a different footprint, while sharing a common base 309 and common bus bars. A particular configuration may be chosen based on variety of factors, including the particular size/shape constraints for the inverter in a given application.

Returning to FIG. 3, the main compartment 308 may house the circuitry of the inverter unit 300. Particularly, the main compartment 308 may contain the inverter power module 200, the inverter driver module 202, the inverter control module 204, and the sensor module 206. Additionally, the main compartment 308 may contain a capacitor 332, among other components.

Figure 7:
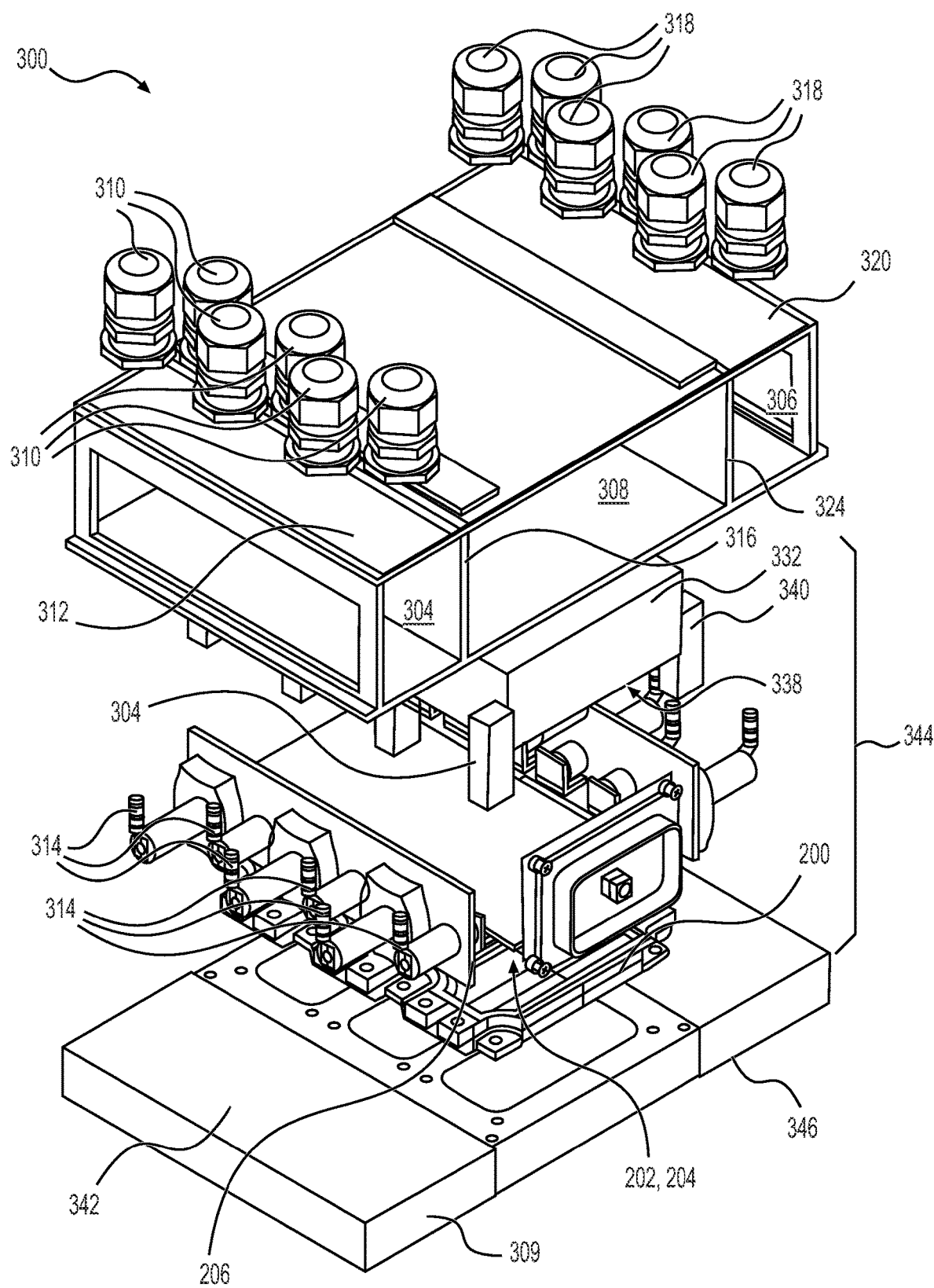
FIG. 7 is an exploded view of the inverter unit of FIG. 3.

In one embodiment, one or more of the inverter power module 200, the inverter driver module 202, and the inverter control module 204 may be arranged in a stack 334 within the main compartment 308. For additional clarity, FIG. 7 identifies the stack 334 in an exploded view of the inverter unit 300. As shown in FIG. 7, the inverter power module 200 may sit on, and mount to, a bottom interior surface 330 of the main compartment 308. The inverter driver module 202 may sit on or above the inverter power module 200, and the inverter control module 204 may sit on or above the inverter driver module 202.

The capacitor 332 may sit on or above the inverter control module 204 and may be coupled between the positive and negative terminals of the DC bus bar 322. In one embodiment, the capacitor 332 may include a cavity 336 in its bottom side 338 that accommodates, e.g., at least partially surrounds, the underlying stacked one or more modules 200-204. To form the cavity 336, the capacitor 332 may have lateral protrusions 340 extending toward the bottom interior surface 330 and laterally enclosing the stacked one or more modules 200-204. The lateral protrusions 340 may either be part of a housing of the capacitor or may be separate mounting hardware elements, depending on the desired assembly and cost benefits of either configuration. As shown in the Figures, the capacitor 332 may fill a majority of the volume of the main compartment 308.

The capacitor 332 may be coupled between the positive and negative terminals of the DC link 112. In operation, the capacitor 332 may reduce the effects of voltage variation on the DC link 112 as the source and/or load vary. Consistent with the disclosed embodiments, the capacitor 332 may be a high-temperature and/or high-density capacitor. For example, in one embodiment, the capacitor 332 may embody a new type of capacitor technology that is high-temperature-capable relative to conventional standard polypropylene film capacitors typically used in such power inverter applications. The capacitor 332 may exhibit twice the energy density of such conventional capacitors. This configuration may allow greater freedom to place the capacitor 332 within the inverter unit 300. For example, placing the capacitor 332 directly over one or more of the modules 200-204 may increase electrical performance and reduce overall package size—enabling an extrusion process to be used for the housing 302, further reducing cost. A conventional film capacitors may not allow for placement directly over the one or more modules 200-204 because they have a roughly 115° C. operating temperature limit and because they would not fit within the extrusion profile dimensional limits of the housing 302.

The main compartment 308 may also contain the sensor module 206. In one embodiment, the sensor module 206 may be arranged on or at the wall 316 that separates the main compartment 308 from the first lateral compartment 304. The AC cable lugs 314, passing through the wall 316, may have respective connections to the sensor module 206.

The base 309 may serve as a structural support for the inverter unit 300. The housing 302 of the inverter unit 300 may sit on, and mount to, a top side 342 of the base 309. The base 309, which may be a heat sink, may draw heat away from the inverter power module 200 and out of the housing 302. The base 309 may have one or more coolant pipes 344, extending lengthwise through the base 309, that circulate fluid coolant (e.g., water) to control the temperature of the base 309. When multiple inverter units 300 are packaged side-by-side, the coolant pipes 344 may extend the length of the multiple units 300 within the common base 309.

Figure 5:
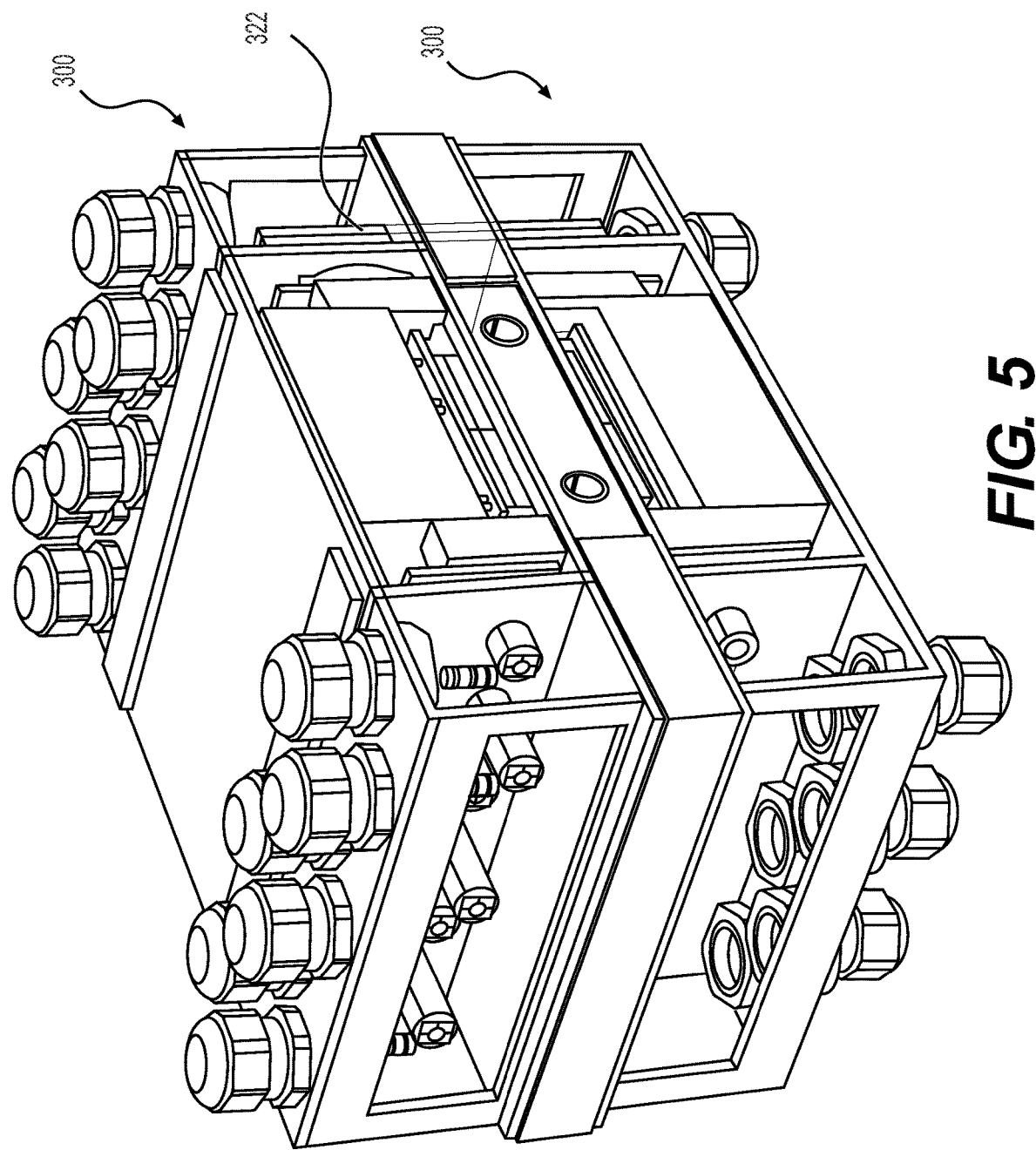
FIG. 5 illustrates two inverter units of FIG. 3 combined in a stack.

When multiple inverter units 300 are stacked back-to-back, as shown in FIG. 5, one inverter unit 300 may sit on and mount to the top side 342 of the base 309 while the other inverter unit 300 may sit on and mount to a bottom side 346 of the base 309. As such, the stacked inverter units 300 may share the same base 309. In one embodiment, the base 309 may be made of extruded aluminum or an aluminum alloy.

Figure 8:
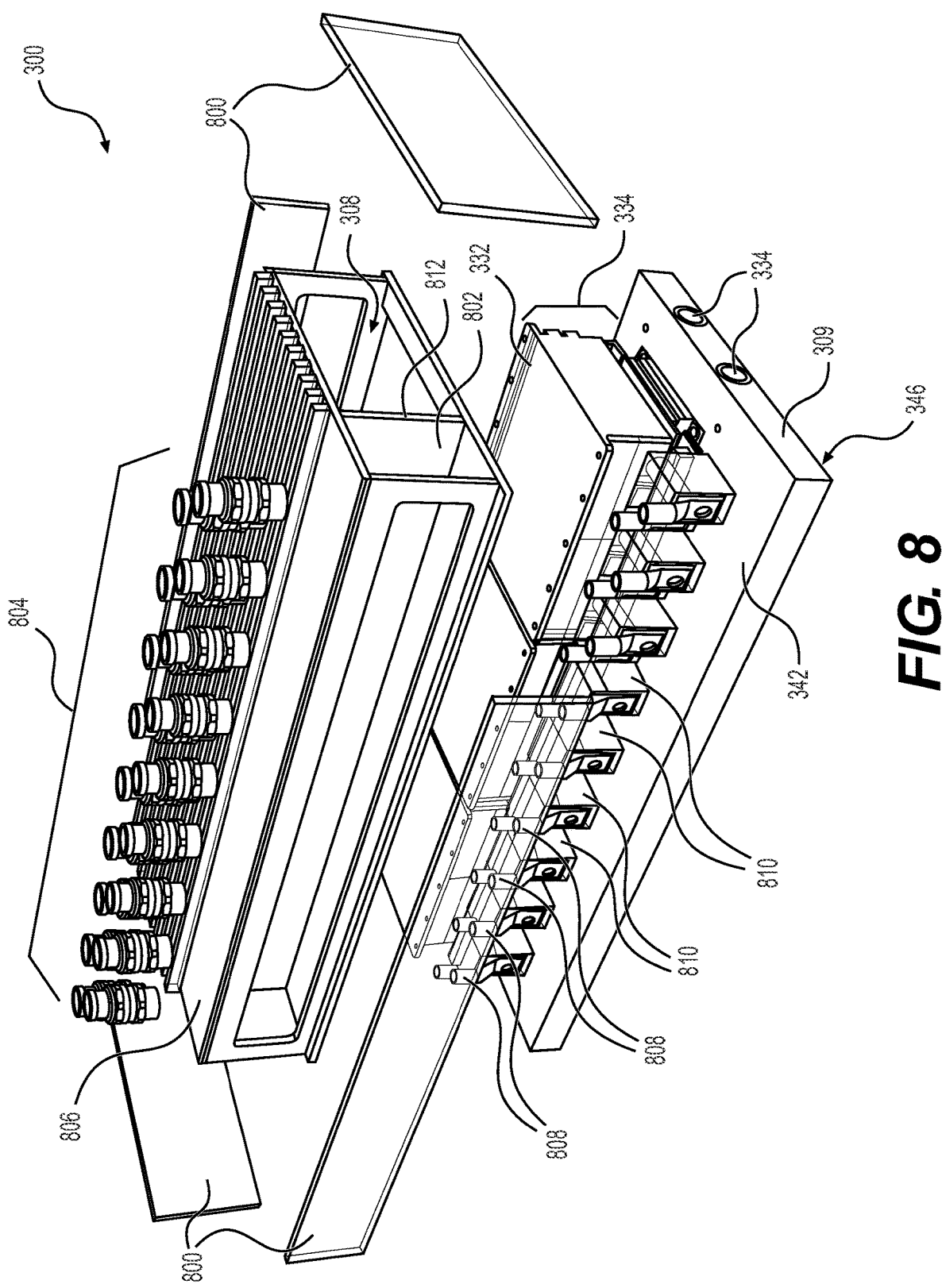
FIG. 8 illustrates a second embodiment of an inverter unit.

FIG. 8 shows another embodiment of an inverter unit 300 (three units shown) with the housing 302 exploded, including covers 800. The housing 302 may be made of extruded aluminum or an aluminum alloy, have a cuboid shape, and provide strain relief and sealing of the inverter unit 300, similar to that discussed above for FIG. 3. In this alternate embodiment, the housing 302 may have the main compartment 308 but only one lateral compartment 802, and the AC and DC connectors may reside on the same side of the inverter unit 300—the side of the lateral compartment 802.

Multiple inverter units 300 of the FIG. 8 embodiment may be combined in a side-by-side and/or back-to-back, sharing a common base 309, as discussed above with respect to FIGS. 4 and 5. Accordingly, the scalability of the disclosed inverter may be accomplished by: scaling within the housing 302 on a single side of the base 309; scaling within two housings 302, one on each side of the base 309; arranging multiple inverter units 300 side-by-side in the same housing 302, with their DC bus bars 322 interconnected externally; and/or arranging multiple inverter units 300 back-to-back, with respect to the base 309, with their DC bus bars 322 interconnected connected externally. It should be appreciated that FIG. 8 shows three identical inverter units 300 arranged side-by-side—within an extended housing 302 having the same cross-sectional profile and on a common base 309—similar to the two inverter units 300 of FIG. 4.

The lateral compartment 802 may house and/or support the AC connection components of the inverter unit 300. AC cable connectors 804, shown in FIG. 8 with their covers removed, may be mounted to a top surface 806 of the lateral compartment 802. When mounted to the top surface 806, the cable connectors 804 may form a seal between the interior of the lateral compartment 802 and the outside environment. In operation, the first ends of a set of electrical cables (not shown) may be connected to the cable connectors 804 and the second ends of the set of electrical cables may connect to an AC load or source, depending on the configuration.

Figure 9:
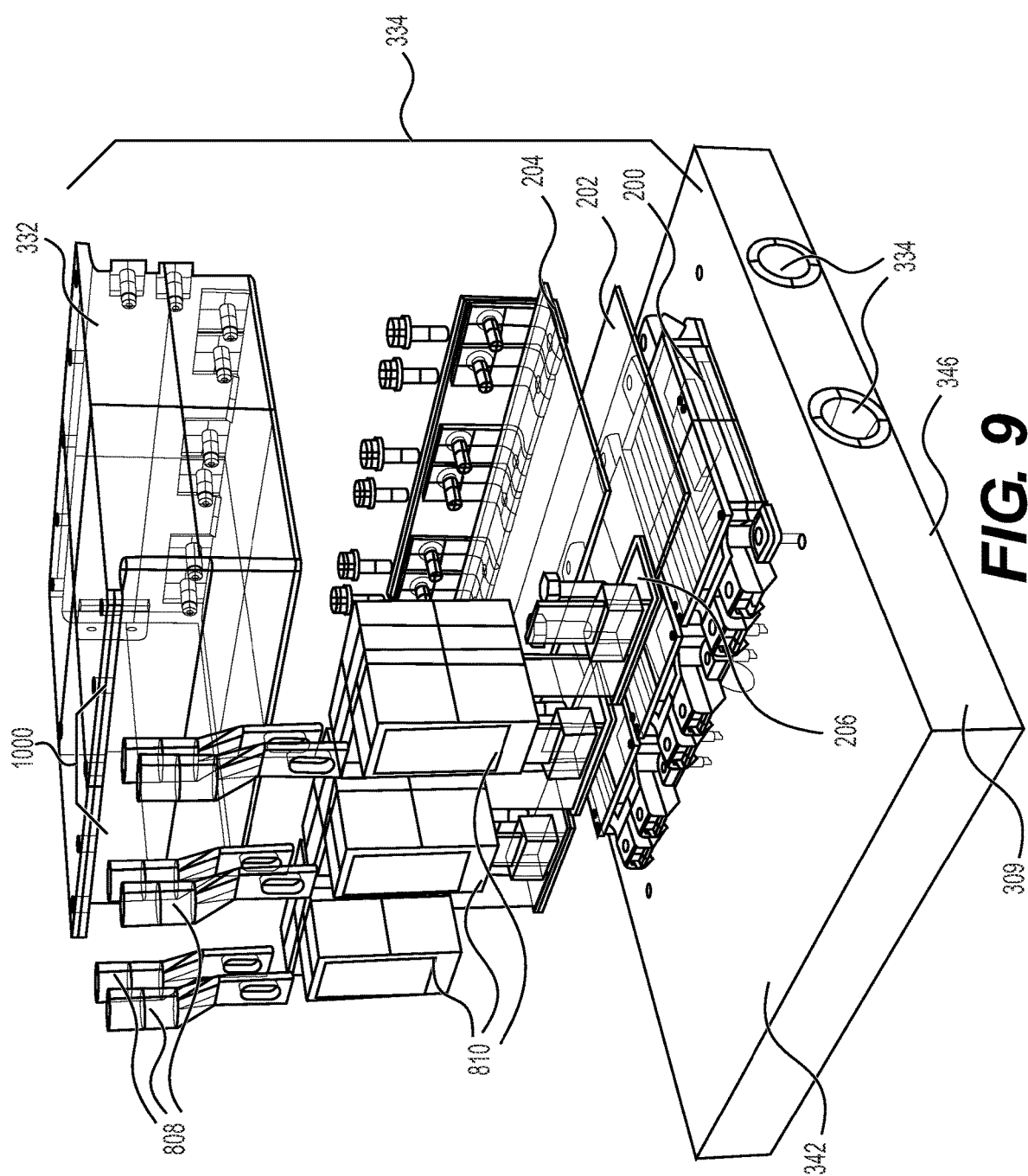
FIG. 9 is an exploded view of the inverter unit of FIG. 8.

Within the lateral compartment 802, respective cable lugs 808 may connect to the cable connectors 804 at one end and, at the other end, fasten to AC terminal block assemblies 810. This can be seen in FIG. 9, which shows an exploded view of the inverter unit 300 of the alternate embodiment. The terminal block assemblies 810 may be mounted to a wall 812 separating the lateral compartment 802 from the main compartment 308.

The cable lugs 808 may receive the AC power output from the interior inverter circuitry in the main compartment 308 and pass it to the AC cable connectors 804. And, when power flows in the other direction, the AC cable lugs 808 may receive an AC power input from the AC cable connectors 804 and pass it to the inverter circuitry in the main compartment 308. In addition to providing a seal, the lateral compartment 802 may provide strain relief that prevents forces exerted on the AC cable connectors 804 from being transmitted to the interior components of the inverter unit 300. The mounting of the terminal block assemblies 810 on the wall 812 additionally provide structural support to prevent the transfer of force exerted on the cable connectors 804 to the inverter's components housed within the main compartment 308.

The main compartment 308 may house the circuitry of the inverter unit 300. Particularly, the main compartment 308 may contain the inverter power module 200, the inverter driver module 202, the inverter control module 204, and the sensor module 206. Additionally, the main compartment 308 may contain the capacitor 332.

Similar to the embodiment of FIG. 3, one or more of the inverter power module 200, the inverter driver module 202, and the inverter control module 204 may be arranged in a stack 334 with the capacitor 332 inside the main compartment 308. The inverter power module 200 may sit on, and mount to, the bottom interior surface 330 of the main compartment 308. The inverter driver module 202 may sit on or above the inverter power module 200, and the inverter control module 204 may sit on or above the inverter driver module 202.

Figure 10:
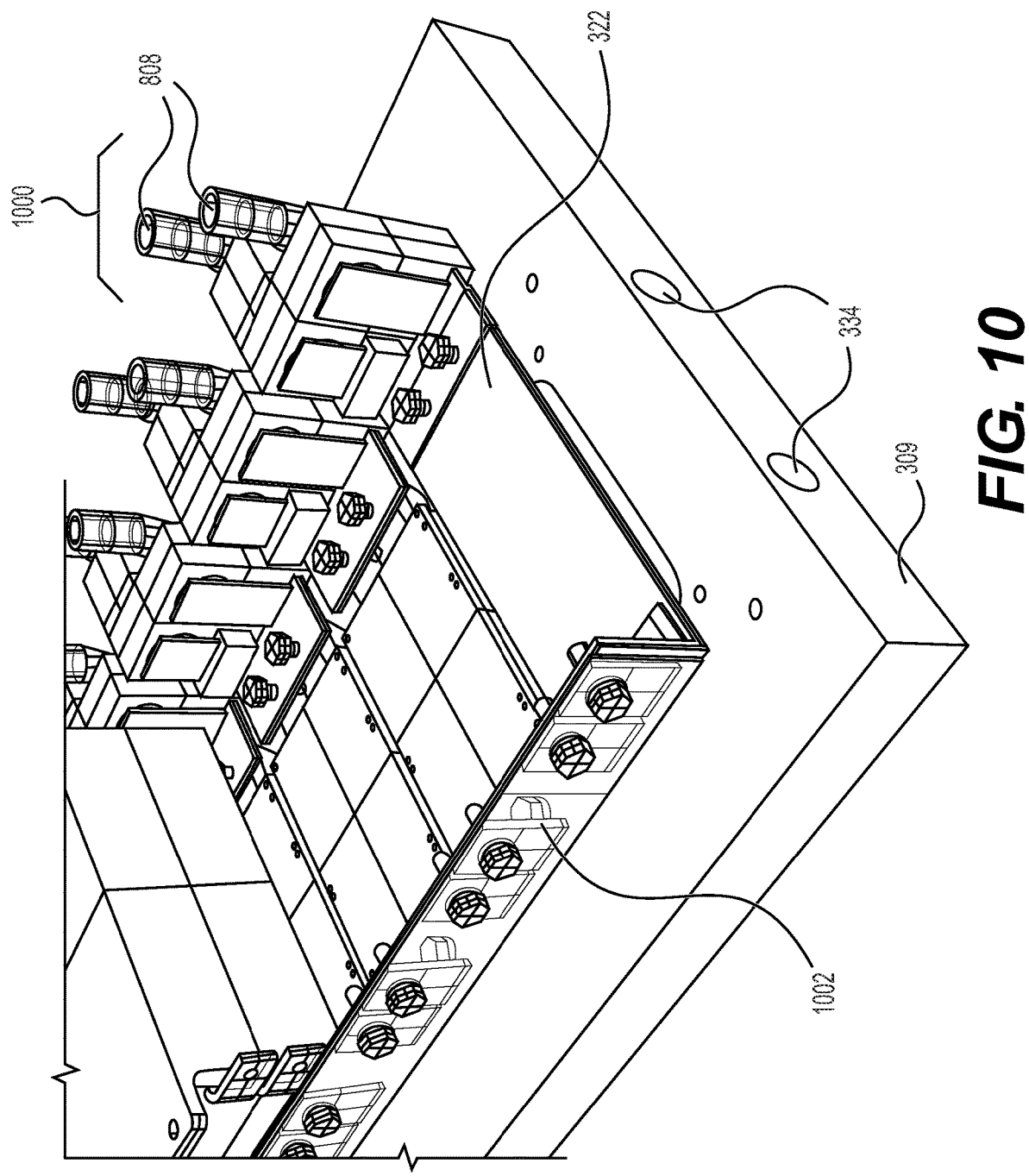
FIG. 10 is a partial perspective view showing certain components of the inverter unit shown in FIG. 8.

The capacitor 332 may sit on or above the inverter control module 204 and may be coupled between the positive and negative terminals of the DC bus bar 322. FIG. 10 shows the configuration of the DC bus bar 322 for the inverter unit of the second embodiment. At the side of the lateral compartment 802, a first end of the DC bus bar 322 may couple to the terminal blocks 810 corresponding to subset 1000 of two of the cable connectors 804. The DC bus bar 322 may extend from the side of the lateral compartment 810, along the bottom interior surface 330 of the housing 302, to the opposite end of the main compartment 308 where they connect to the DC link 112. As shown in the Figures, the capacitor 332 may fill a majority of the volume of the main compartment 308. Consistent with the disclosed embodiments, the capacitor 332 may be a high-temperature and/or high-density capacitor.

The main compartment 308 may also contain the sensor module 206. In one embodiment, the sensor module 206 may be arranged on or at the wall 812 that separates the main compartment 308 from the lateral compartment 802. Rear portions of the terminal block assemblies 810, passing through the wall 812, may have respective connections to the sensor module 206 as well as to an AC bus bar 1002.

INDUSTRIAL APPLICABILITY

The disclosed embodiments may find application in environments in which it is desirable to scale an inverter across a range of power levels. The disclosed inverter unit 300 may be used alone or combined with additional inverter units 300 for higher power levels. This may allow custom solutions with a linear relationship between power and cost—rather than a nonlinear relationship in which it becomes increasingly costly for an inverter having more power. This benefit may be due, in part, to the ability to extrude a housing 302 and/or a base 309 to a desired size corresponding to the number of inverter units needed for the given power application.

For example, one customer may have an application that requires 150 kW, which a single inverter unit 300 may be able to produce. In this case, a housing 302 and base 309 may be extruded to provide packaging for a single inverter unit 300. But another customer may have an application that requires 1,200 kw, which requires eight inverter units 300 (1,200/150=8). In this case, the customer may choose one of two package options (or stacked) for the eight inverter units 300, depending on space constraints or other factors. For example, the customer may choose a package in which the eight units 300 are arranged in a (as in FIG. 4), which will have a certain length. Alternatively, the customer may choose a package in which the eight units 300 are arranged as two of four units 300 stacked (as in FIG. 6), which will have about half that length but a greater height. Either of these types of packages may be accommodated by extruding the shared housing 302 and base 309 accordingly.

Additionally, the stack 334 within the inverter unit 300 including the capacitor 332 and one or more of modules 200-204 enables an efficient physical packaging of the inverter components within the housing 302 that allows for scalability. In conventional inverters, stacking the capacitor on the inverter modules in this manner would cause the capacitor, and potentially one or more electronic modules, to overheat, resulting in inverter failure. Conventional wisdom, therefore, leads away from the type of inverter packaging described herein. Using a high-energy, high-density capacitor 332, as disclosed herein, however, enables the physically-efficient stacking of the components described herein by making it thermally-feasible.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A power inverter, comprising:
   an inverter unit comprising:
      a housing defining a main compartment and a first lateral compartment adjacent the main compartment, wherein the main compartment contains:
         an inverter power module configured to convert direct current (DC) power into alternating current (AC) power output;
         an inverter driver module configured to provide driving signals to drive the inverter power module;
         an inverter control module configured to provide control signals to the inverter driver module to control the AC power output; and
         a capacitor for coupling to the DC power, the capacitor being arranged on or over at least one of the inverter power module, the inverter driver module, or the inverter control module; and
      a base on which the housing sits, the base comprising a heat sink configured to draw heat away from one or more of the inverter power module, the inverter driver module, or the inverter control module.

2. The power inverter of claim 1, wherein the capacitor defines a cavity, at least a portion of one or more of the inverter control module, the inverter driver module, and the inverter power module being disposed in the cavity.

3. The power inverter of claim 1, wherein the inverter unit further includes:
   a plurality of AC cable connectors mounted to an outer surface of the first lateral compartment, the plurality of AC cable connectors being configured to connect to an AC load or source; and
   a plurality of AC cable lugs disposed within the first lateral compartment, the plurality of AC cable lugs being respectively connected to the plurality of AC cable connectors,
   wherein the plurality of AC cable lugs is electrically connected to the inverter power module.

4. The power inverter of claim 3, wherein the inverter unit further includes a plurality of terminal blocks arranged within the first lateral compartment, and the plurality of cable lugs are connected to the plurality of terminal blocks.

5. The power inverter of claim 3, wherein the inverter unit further includes:
   a set of DC cable connectors mounted the outer surface of the first lateral compartment, the plurality of DC cable connectors being configured to connect to a DC link; and
   a set of DC cable lugs disposed within the first lateral compartment, the set of DC cable lugs being respectively connected to the set of DC cable connectors.

6. The power inverter of claim 5, wherein the inverter unit further includes a DC bus bar arranged within the first lateral compartment, the DC bus bar electrically coupling the DC cable lugs to the inverter power module, wherein the capacitor is coupled to the DC bus bar.

7. The power inverter of claim 6, wherein the DC bus bar extends from the DC cable lugs at a front side of the inverter unit to a rear side of the inverter, wherein the DC bus bar electrically couples to the inverter power module at the rear side.

8. The power inverter of claim 3, the housing further defining a second lateral compartment adjacent the main compartment and opposite the first lateral compartment, the second lateral compartment having a plurality of DC cable connectors mounted to an outer surface of the second lateral compartment,
   wherein the inverter unit further includes a DC bus bar arranged within the second lateral compartment and coupling the DC cable connectors, and the capacitor is coupled to the DC bus bar.

9. The power inverter of claim 1, wherein the inverter unit further includes a sensor module arranged within the main compartment, the sensor module being configured to sense a power output of the inverter module and to provide information about the sensed power output to the inverter control module.

10. The power inverter of claim 9, wherein the housing further includes a wall separating the main compartment from the first lateral compartment, wherein the sensor module is arranged at or on the wall.

11. The power inverter of claim 1, further comprising a second inverter unit, the second inverter unit including:
    a second housing defining a second main compartment and a second lateral compartment adjacent the second main compartment, wherein the second main compartment of the second housing contains:
       a second inverter power module configured to convert direct current (DC) power into alternating current (AC) power;
       a second inverter driver module configured to provide driving signals to drive the second inverter power module;
       a second inverter control module configured to provide control signals to the second inverter driver module; and
       a second capacitor arranged on or over at least one of the second inverter power module, the second inverter driver module, or the second inverter control module.

12. The power inverter of claim 11, wherein the inverter unit is a first inverter unit, the first inverter unit sits on a first surface of the base, the second inverter unit sits on a second surface of the base opposite the first surface, and the base is further configured to draw heat away from one or more of the second inverter power module, the second inverter driver module, or the second inverter control module.

13. The power inverter of claim 11, wherein the inverter unit is a first inverter unit, the first inverter unit is adjacent the second inverter unit, the first and second inverter units sit on a first surface of the base, and base is further configured to draw heat away from one or more of the second inverter power module, the second inverter driver module, or the second inverter control module.

14. The power inverter of claim 1, further comprising one or more cooling passages extending through the base.

15. A machine, comprising:
a power source;
a generator mechanically coupled to the power source and configured to generate alternating current (AC) power;
a rectifier coupled to receive alternating current (AC) power from of the generator and provide a rectified output;
a direct current (DC) link configured to receive the rectified output and provide a DC power output; and
an inverter unit comprising:
 a housing defining a main compartment and a first lateral compartment adjacent the main compartment, wherein the main compartment contains:
  an inverter power module configured to convert the DC power output into an AC power output;
  an inverter driver module configured to provide driving signals to drive the inverter power module;
  an inverter control module configured to provide control signals to the inverter driver module to control the AC power output; and
  a capacitor for coupling to the DC power, the capacitor being arranged on or over at least one of the inverter power module, the inverter driver module, or the inverter control module; and
 a base on which the housing sits, the base comprising a heat sink configured to draw heat away from one or more of the inverter power module, the inverter driver module, or the inverter control module.

16. The machine of claim 15, wherein the capacitor defines a cavity, at least a portion of one or more of the inverter control module, the inverter driver module, and the inverter power module being disposed in the cavity.

17. The machine of claim 15, wherein the inverter unit further includes:
a plurality of AC cable connectors mounted to an outer surface of the first lateral compartment, the plurality of AC cable connectors being configured to connect to an AC load or source; and
a plurality of AC cable lugs disposed within the first lateral compartment, the plurality of AC cable lugs being respectively connected to the plurality of AC cable connectors,
wherein the plurality of AC cable lugs is electrically connected to the inverter power module.

18. A power inverter, comprising:
a first inverter unit comprising:
 a first housing portion defining a first main compartment and a first lateral compartment adjacent the main compartment, wherein the first main compartment contains:
  a first inverter power module configured to convert direct current (DC) power into alternating current (AC) power output;
  a first inverter driver module configured to provide driving signals to drive the inverter power module;
  a first inverter control module configured to provide control signals to the inverter driver module to control the AC power output; and
  a first capacitor for coupling to the DC power, the capacitor being arranged on or over at least one of the inverter power module, the inverter driver module, or the inverter control module; and
a second inverter unit comprising:
 a second housing portion defining a second main compartment and a second lateral compartment adjacent the second main compartment, wherein the second main compartment contains:
  a second inverter power module configured to convert the DC power into the AC power;
  a second inverter driver module configured to provide driving signals to drive the second inverter power module;
  a second inverter control module configured to provide control signals to the second inverter driver module; and
  a second capacitor for coupling to the DC power, the second capacitor being arranged on or over at least one of the second inverter power module, the second inverter driver module, or the second inverter control module; and
a base on which the first and second housings sit, the base comprising a heat sink configured to draw heat away from one or more of the first and second power modules, the first and second inverter driver modules, or the first and second inverter control modules.

19. The power inverter of claim 18, wherein:
the first inverter unit sits on a first surface of the base, the second inverter unit sits on a second surface of the base opposite the first surface, or
the first inverter unit is adjacent the second inverter unit and the first and second inverter units sit on the first surface.

20. The power inverter of claim 18, further including:
a DC bus bar electrically coupling DC connectors of the first inverter unit to DC connectors of the second inverter unit; and
an AC bus bar electrically coupling AC connectors of the first inverter unit to AC connectors of the second inverter unit.

* * * * *